United States Patent
Szydlowski et al.

(10) Patent No.: US 9,249,755 B2
(45) Date of Patent: Feb. 2, 2016

(54) METHOD FOR DEFINING THE SHAPE OF A TURBOMACHINE CONVERGENT-DIVERGENT NOZZLE, AND CORRESPONDING CONVERGENT-DIVERGENT NOZZLE

(71) Applicant: SNECMA, Paris (FR)

(72) Inventors: Julien Szydlowski, Paris (FR); Guillaume Bodard, Verneuil l'etang (FR); Matthieu Leyko, Melun (FR); Jonathan Langridge, Melun (FR)

(73) Assignee: SNECMA, Paris (FR)

( * ) Notice: Subject to any disclaimer, the term of this patent is extended or adjusted under 35 U.S.C. 154(b) by 473 days.

(21) Appl. No.: 13/764,125

(22) Filed: Feb. 11, 2013

(65) Prior Publication Data
US 2013/0206865 A1 Aug. 15, 2013

(30) Foreign Application Priority Data

Feb. 10, 2012 (FR) ...................................... 12 51289

(51) Int. Cl.
*F02K 1/48* (2006.01)
*F02K 1/38* (2006.01)
*F02K 1/46* (2006.01)
*A45D 34/00* (2006.01)
*A45D 40/00* (2006.01)

(52) U.S. Cl.
CPC . *F02K 1/48* (2013.01); *A45D 34/00* (2013.01); *A45D 40/00* (2013.01); *F02K 1/386* (2013.01); *F02K 1/46* (2013.01); *F05B 2250/611* (2013.01); *F05D 2240/127* (2013.01); *F05D 2250/323* (2013.01); *F05D 2260/96* (2013.01); *F05D 2270/20* (2013.01); *Y10T 29/49826* (2015.01)

(58) Field of Classification Search
CPC ............... F02K 1/48; F02K 1/46; F02K 1/78; F02K 1/82; F02K 1/822; F02K 1/825; F02K 1/827; F02K 1/386; F05D 2240/127

USPC ............................ 60/770, 771, 226.1, 226.3; 239/265.11–265.43
See application file for complete search history.

(56) References Cited

U.S. PATENT DOCUMENTS 5,120,004 A * 6/1992 Matthias ................... 244/110 B
6,082,635 A    7/2000 Seiner et al.
(Continued)

FOREIGN PATENT DOCUMENTS

EP    1 752 649 A2    2/2007
EP    1 995 441 A2    11/2008

OTHER PUBLICATIONS

French Preliminary Search Report issued Oct. 24, 2012, in Patent Application No. FR 1251289, filed Feb. 10, 2012 (with English Translation of Category of Cited Documents).

*Primary Examiner* — Steven Sutherland
(74) *Attorney, Agent, or Firm* — Oblon, McClelland, Maier & Neustadt, L.L.P.

(57) ABSTRACT

According to the invention, the method for defining the shape of a convergent-divergent nozzle of longitudinal axis L-L comprising a convergent part connected, at a throat, to a divergent part the downstream free end of which comprises scallops delimiting noise-reducing chevrons distributed in the circumferential direction, comprises defining beforehand the divergent part of the nozzle using a divergent first portion, a divergent second portion and a convergent portion, attributing an initial value to dimensional parameters defining the chevrons and the three portions, calculating performance criteria and checking that the calculated performance criteria satisfy predefined performance conditions.

15 Claims, 2 Drawing Sheets

(56) References Cited

U.S. PATENT DOCUMENTS

| | | | |
|---|---|---|---|
| 6,360,528 B1 * | 3/2002 | Brausch et al. | 60/262 |
| 6,658,839 B2 * | 12/2003 | Hebert | 60/204 |
| 8,356,468 B2 * | 1/2013 | Cerra et al. | 60/262 |
| 2004/0244357 A1 | 12/2004 | Sloan | |
| 2007/0033922 A1 | 2/2007 | Reba et al. | |
| 2009/0071164 A1 | 3/2009 | Renggli | |
| 2010/0257865 A1 | 10/2010 | Mengle | |
| 2011/0155862 A1 | 6/2011 | Mengle | |

* cited by examiner

METHOD FOR DEFINING THE SHAPE OF A TURBOMACHINE CONVERGENT-DIVERGENT NOZZLE, AND CORRESPONDING CONVERGENT-DIVERGENT NOZZLE

The present invention relates to the general field of reducing noise at the outlet of a turbomachine nozzle.

In particular, the present invention seeks to define the shape of a turbomachine convergent-divergent nozzle which at its downstream end comprises chevrons for reducing the jet noise.

It is known that the jet leaving a turbomachine nozzle encounters at least one other gaseous flow. Thus:

when the turbomachine is a single-flow turbomachine, this single flow comes into contact with the external air surrounding the nozzle; and when the turbomachine is a double-flow (bypass) turbomachine, the primary flow (or hot flow) and the secondary or bypass flow (or cold flow) come into contact with one another, and also with the external air.

The difference in velocity between the jet leaching the nozzle and the other gaseous flows that it encounters leads to shearing of fluids as these gaseous flows penetrate one another, causing noise, commonly termed "jet noise".

The jet noise—which is the predominant noise during an aircraft takeoff—is a noise covering a broadband of frequencies and generated by two types of acoustic source. It can notably be broken down into:

a high-frequency noise originating from small turbulent structures of the mixing between the hot and cold flows and perceived essentially close to the nozzle; and a low frequency noise originating from the large vortex structures that occur distant from the jet.

So, in order to reduce the jet noise, one known solution is to optimise the mixing of the flows as they leave the nozzle. To do that, patent document EP1 873 389 A1 (owned by the applicant company) describes a simple convergent nozzle that lateral cowl of which is provided with a plurality of chevrons (also referred to as teeth) distributed about the entire circumference of the trailing edge thereof. Thanks to the introduction of these chevrons, the mixing between the flows leaving the nozzle is improved and the creation of swirling vortices near the nozzle allows kinetic energy to be better dissipated and, therefore, allows the turbulent intensity of the large vortices that are the major sources of noise to be reduced. The low-frequency noise is therefore significantly diminished.

However, in the case of a turbomachine convergent-divergent nozzle, the incorporation of noise-reducing chevrons at the trailing edge of the nozzle is unsatisfactory. This is because a pronounced inclination of the chevrons towards the outlet jet is generally needed in order to obtain an acceptable reduction in jet noise, yet this leads to impaired turbomachine performance and also leads to the loss of the divergent nature of the nozzle—or at the very least to a lessening of this divergent nature—and therefore impairs the operability of the turbomachine.

It is an object of the present invention to overcome these disadvantages and, notably, to define the shape of a turbomachine convergent-divergent nozzle equipped with noise-reducing chevrons that allows the nozzle to retain its convergent-divergent nature, while at the same time obtaining a satisfactory reduction in jet noise and limiting the extent to which the propulsive and operational performance of the turbomachine is impaired.

Thus, according to the invention, the Method for defining the shape of an annular cowl having an external wall and an internal wall defining a convergent-divergent nozzle of longitudinal axis L-L of a turbomachine, either about the said axis, or about a casing of revolution about the said axis L-L, the said nozzle comprising, in the direction in which the gases flow, a convergent part connected, at a throat, to a divergent part the downstream free end of which has scallops delimiting noise-reducing chevrons distributed in the circumferential direction, comprises the following steps:

A/ the divergent part of the nozzle is defined beforehand using the following two portions:

a divergent first portion extending longitudinally from the throat of the nozzle as far as the tops of the scallops;

a second portion extending longitudinally between the tops of the scallops as far as the tips of the said chevrons;

B/ an initial value is attributed to dimensional parameters defining the chevrons and the cowl in the said divergent part;

C/ an optimization algorithm is applied to the set of parameters thus initialized in order to define the shape of convergent-divergent nozzle equipped with chevrons that satisfies predefined conditions regarding at least one defined performance criterion.

Such a method is notable in that the second portion corresponding to the chevrons is forced to comprise:

a divergent part extending longitudinally between the tops of the scallops and an internal cross section of maximum surface area of the said divergent part;

a convergent part extending longitudinally from the internal cross section of maximum cross-sectional area as far as the tip of the said chevrons.

Thus, by virtue of the invention, it is possible to define the shape of a convergent-divergent nozzle equipped with noise-reducing chevrons in such a way that it satisfies one or more set performance criteria while at the same time maintaining its convergent-divergent appearance despite the presence of the chevrons and despite the presence of a convergent portion in the divergent part of the nozzle. In other words, the definitive shape of the nozzle equipped with chevrons (notably its parts that is divergent overall) is the result of a compromise between turbomachine performance (notably operating performance, propulsive performance and the intensity of the jet noise) and operability thereof. Further, the convergent end portion allows part of the jet of gas from the nozzle to be directed towards the longitudinal axis L-L to encourage the mixing of the flows thereby, at least partially, deforming the outlet jet. This deformation relies on alternating penetrations of the hot and cold flows in one another. This then yields a reduction in jet noise, notably low-frequency noise, while at the same time limiting the penalties paid in terms of propulsion and operational performance.

Advantageously, at least some of the steps in the method of the invention can be carried out automatically.

For preference, in the method, the cross-sectional area of the outlet section of the nozzle, at the tips of the chevrons, is forced to be at most equal to the cross-sectional area of the nozzle at the tops of the scallops.

This layout makes it possible to obtain chevrons the shape of which remains within the envelope of the initial nozzle cowling.

In an alternative form of embodiment of the method, the cross-sectional area of the outlet section of the nozzle, at the tips of the chevrons, is forced to be at most equal to the cross-sectional area of the nozzle at the throat of the nozzle.

In one embodiment according to the present invention, during step C/, at least three performance criteria associated with the convergent-divergent nozzle equipped with chevrons are calculated.

In particular, the performance criteria may belong to the following group of performance criteria:

the difference between the discharge coefficient at take off speed (for which the flow of the gases through the divergent part is subsonic) and that at cruising speed (for which the flow of gases through the divergent part of the nozzle is supersonic) of the nozzle equipped with chevrons. Using this criterion, a constraint is imposed regarding the convergent-divergent appearance of the nozzle that is to be defined, in order to ensure satisfactory turbomachine performance on takeoff and during cruising flight;

the difference between the thrust coefficient at cruising speed of a reference convergent-divergent nozzle without chevrons and that of the said convergent-divergent nozzle equipped with chevrons. Using this criterion, it is possible to control the losses of thrust that are due to the presence of the chevrons;

the difference between the intensity of the jet noise of the reference convergent-divergent nozzle and that of the said convergent-divergent nozzle equipped with chevrons. Thus, a constraint is imposed on the noise reduction obtained by the chevrons.

For preference, the performance condition associated:

with the difference in discharge coefficients is satisfied when this difference is at least equal to a first predefined threshold value, preferably equal to 0.015;

with the difference in thrust coefficients is satisfied when this difference is less than a second predefined threshold value, preferably equal to 0.001;

with the difference in jet noise intensities is satisfied when this difference is positive and, preferably, at least equal to a third predefined threshold value.

Further which at least certain dimensional parameters associated with the chevrons and with the three portions of the said divergent part may belong to the following group of parameters:

the length, defined in the direction parallel to the longitudinal axis L-L, of the first divergent portion;
the length of the second divergent portion;
the length of the convergent portion;
the internal radius at the tops of the scallops;
the maximum internal radius of the divergent part of the nozzle;
the internal radius at the tip of the chevrons;
the angle formed between the longitudinal axis L-L and the tangent at the downstream end point of a line of the internal surface of the chevrons, the said line belonging to an axial plane passing through the tips of the chevrons and intercepting the longitudinal axis L-L;
the angle formed between the longitudinal axis L-L and the tangent at the downstream end point of a line of the external surface of the nozzle passing through the top of a scallop and belonging to an axial plane intercepting the longitudinal axis L-L.

Moreover, the present invention also relates to a Convergent-divergent nozzle for a turbomachine, comprising, in the direction in which the gases flow, a convergent part connected, at a throat, to a divergent part the downstream free end of which has scallops delimiting noise-reducing chevrons distributed in the circumferential direction, which is defined according to the method described herein above.

For preference, the internal surface of each of the chevrons is concave.

Further, the concavity of the internal surfaces of the chevrons is advantageously defined in such a way that at least one internal cross section of the nozzle, defined in a transverse plane locally orthogonal to the axis L-L and intercepting the said chevrons, is of circular shape.

The figures of the attached drawing will make it easy to understand how the invention may be embodied. In these figures, identical references denote elements which are similar.

By convention in this document, a divergent portion of the nozzle corresponds to a part in which the cross-sectional area of the internal air passage increases from upstream to downstream, and a convergent part is one in which this area decreases from upstream to downstream. This document considers nozzles that are of revolution about an axis L-L, with a flow configuration such that the nozzle can be effectively geometrically characterized by the successive sections thereof through which the flow passes.

When there is no central body, the cross section of the nozzle is defined by a section transverse to the axis L-L, and its cross-sectional area is defined solely by the radius of the internal wall of the cowl in this plane.

When the nozzle corresponds to the air duct defined between a cowl and a central body, for example the casing of the engine, the cross section of the nozzle at a given point is defined by a cross section through the air duct in the form of a cone frustum. In an axial section, this cone frustum corresponds to a straight line which is not entirely orthogonal to the axis L-L and which minimizes the distance between the walls at a given point. Only nozzle geometries in which sections can thus be defined continuously along the length, as far as the end of the chevrons, are considered here. In this configuration, the section is of annular shape, its area no longer depending solely on the value of the radius at the point of contact with the internal wall of the cowl, but being also dependent on the geometry of the central body.

For the sake of the simplicity of the explanation, the invention is set out primarily for implementation in the case of a nozzle of circular cross section with no central body.

Figure 1:
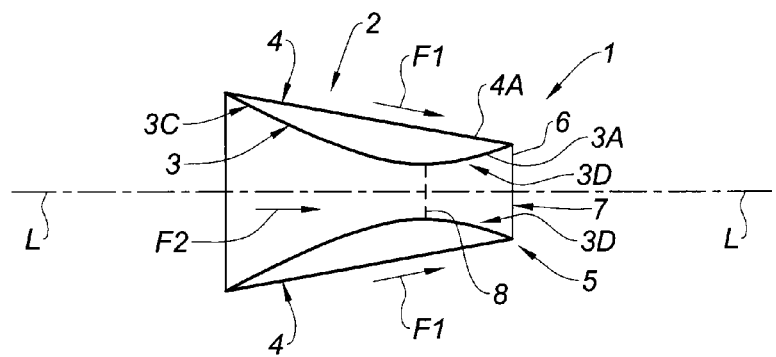
FIG. 1 depicts, in schematic axial section, a known convergent-divergent nozzle for a turbomachine, without noise-reducing chevrons.

FIG. 1 depicts a known reference convergent-divergent nozzle 1 of a single-flow turbomachine. The reference nozzle 1 comprises a lateral cowl 2 of annular shape and of longitudinal axis L-L.

The cowl 2 is formed of an internal wall 3, defining an internal face 3A, and of an external wall 4, defining an external face 4A.

The internal wall 3 and external wall 4 are joined together at their downstream end 5, with respect to the direction in which the flows flow, to define the trailing edge 6 of the reference nozzle 1, which delimits its outlet orifice 7.

The annular internal face 3A of the reference nozzle 1 has a convergent part 3C connected to a divergent part 3D at a throat 8. The annular external face 4 for its part simply converges towards the axis L-L.

The reference nozzle 1 has no noise-reducing chevrons.

Figure 2:
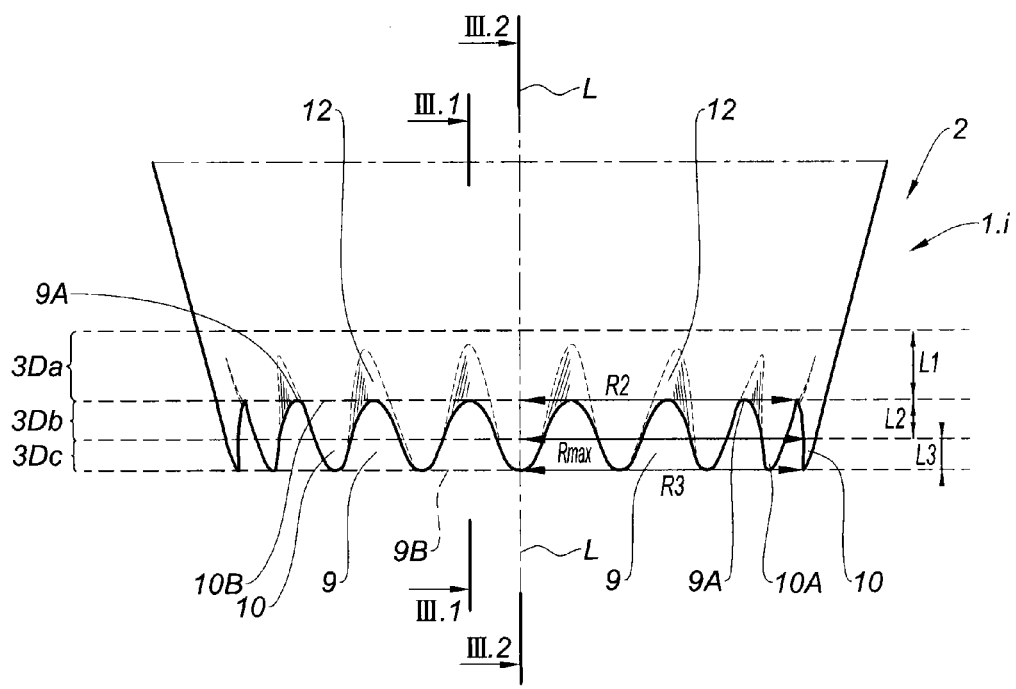
FIG. 2 is a schematic rear profile view of one example of a convergent-divergent nozzle defined according to the present invention and comprising noise-reducing chevrons.

FIG. 2 depicts the rear part of an example of a convergent-divergent nozzle 1.i defined according to the present invention. Those elements of the nozzle 1.i of the invention that are similar to those of the known reference nozzle 1 are defined using identical references.

According to the invention, the cowl 2 of the nozzle 1.i has scallops 9 of rounded triangular shape cut near its downstream end 5. The scallops 9 thus define noise-reducing chevrons 10 likewise of rounded triangular shape, in the continuation of the cowl 2. Naturally, the scallops and the chevrons could have any other suitable shape (for example trapezoidal shape).

The scallops 9, evenly spaced apart in the circumferential direction (although that could be otherwise), are defined by a top 9A and a base 9B. likewise, the chevrons 10, defined by a tip 10A and a base 10B, are evenly spaced apart.

Further, although the case may be different, in the example of FIG. 2, the scallops 9 are all identical. The same is therefore true of the chevrons 10.

Figure 3:
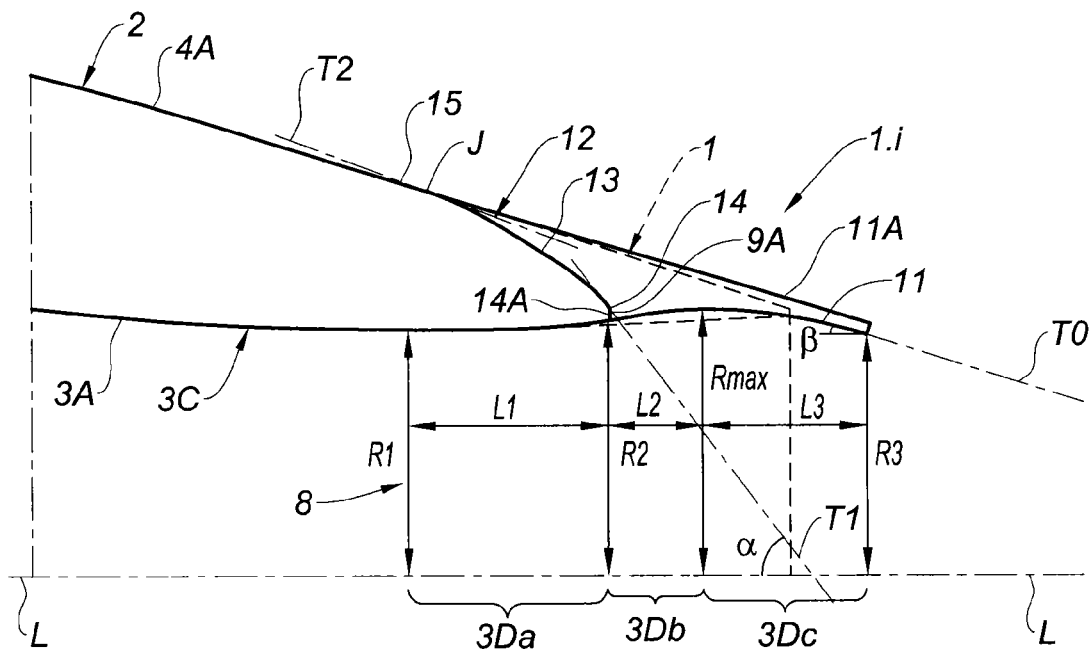
FIG. 3 is a superposition of the schematic cross sections of the rear of the convergent-divergent nozzle of FIG. 2 for sections of III.1-III.1 and III.2-III.2 respectively.
Figure 4:
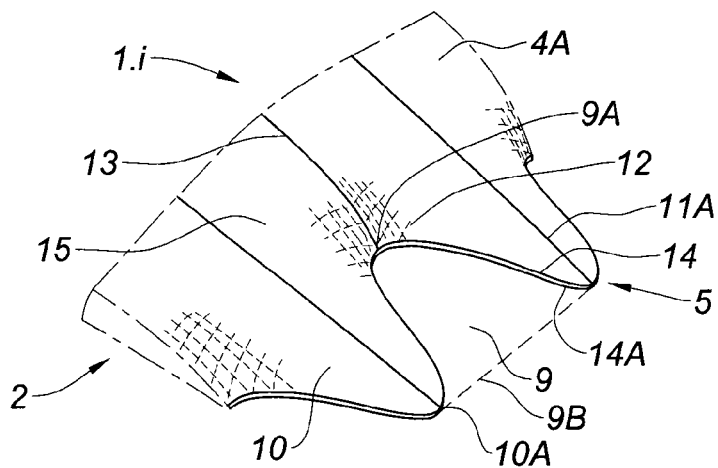
FIG. 4 shows, in an enlarged perspective schematic view, two chevrons of the nozzle of FIG. 2.

As FIGS. 2 and 3 show, the divergent part 3D of the nozzle 1.i is defined, according to the invention, by the following three portions:

a divergent first portion 3Da extending longitudinally from the throat 8 of the nozzle 1.i as far as the top 9A of the scallops 9. It is defined by a length L1, in a direction parallel to the longitudinal axis L-L, an internal radius R1 at the throat 8 and an internal radius R2 at the tops 9A of the scallops 9;

a divergent second portion 3Db extending longitudinally from the tops (A of the scallops 9 as are as an internal cross section of the divergent part 3D that has a maximum internal radius Rmax (FIG. 2). It is defined by a length L2, the internal radius R2 and the radius Rmax; and a convergent portion 3Dc extending longitudinally from the internal cross section of maximum radius Rmax as far as the tips 10A of the chevrons 10. It is defined by a length L3, the radius Rmax and an internal radius R3 at the tips 10A of the chevrons 10.

The three portions 3Da, 3Db and 3Dc, which are of circular cross section, are adjacent two-by-two.

Further, as FIG. 3 shows, the internal surface of the chevrons 10—defined by the internal face 3A of the cowl 2—is concave rounded. In particular, in the longitudinal direction, the internal surface of the chevrons 10 is divergent from their base 10B to the internal section of maximum radius Rmax (divergent second portion 3Db), then converges towards the axis L-L from the maximum section as far as the tip 10A (convergent portion 3Dc).

The concavity of the internal surfaces of the chevrons 10 is such that at least one internal cross section of the nozzle 1.i—defined in a transverse plane orthogonal to the axis L-L and intercepting the chevrons 10—is of circular shape.

Figure 5:
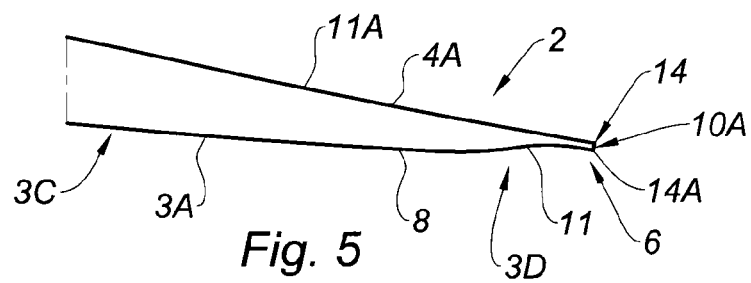
FIG. 5 depicts a surface line of the internal and external walls at a chevron of FIG. 4.

As FIGS. 3 and 5 show, the concavity of the chevrons is characterized by the angle $\beta$ formed between the longitudinal axis L-L and the tangent T0 at the downstream end point of a line 11 of the internal surfaces of the chevrons 10. The surface line 11 belongs to an axial plane passing through the tip 10a of the chevrons 10 and intercepting the longitudinal axis L-L.

It should be noted that, in order to improve the mixing of the flows, the tangent to the downstream end point 5 of a line 11A of the external surface of the chevrons 10—the line 11A belongs to an axial plane passing through the tips 10A of the chevrons 10 and intercepting the longitudinal axis L-L—is parallel to the tangent T0, such that the flows of gas F1 and F2 flowing respectively along the internal surface and along the external surface of the chevrons 10 are oriented substantially in one and the same direction which converges towards the axis L-L.

Further, according to another advantageous feature of the present invention, the part of the external face 4A of the cowl 2 is shaped to reveal, near the contour of each scallop 9, a three-dimensional connection surface 12 exhibiting convex curvilinear surface lines 13 (FIG. 3).

A surface line 13 means a line which belongs to the external face 4a and which is defined in an axial plane passing through the longitudinal axis L-L.

Such a shaping of the external face 4A can be obtained using a machining, moulding, pressing operation etc.

Moreover, as indicated in FIGS. 5 and 6, in the embodiment depicted, the radial thickness of the contour of each scallop 9—defined between the outlines 14 and 14A—is kept constant along it. It is preferably equal to the thickness of the trailing edge of the cowl 2 of the reference nozzle 1, namely 3.5 mm for example.

The radius of curvature associated with each of the points forming the convex surface lines 13 of a connection surface 12 is maximized while at the same time preventing a point of inflection from occurring. The convexity of the connection surfaces 12 is thus softened in order to limit disturbances to the flow of gas F1 running along the external face 4A.

Further, for each scallop 9, an angle $\alpha$ is defined between the longitudinal axis L-L and the tangent T1 to the downstream end point 5 of the external surface line 13 passing through the top 9A of the scallop 9 and belonging to an axial plane intercepting the longitudinal axis L-L.

According to the invention, the angle $\alpha$ is reduced as far as possible without, once again, thereby causing a point of inflection to occur. As an alternative, it is possible for the angle $\alpha$ not to be minimized during the definition of the definitive shape of the divergent part 3D of the nozzle 1.i.

Thus, the connection surfaces 12 guide the gaseous flow F1 towards the longitudinal axis L-L of the nozzle 1.i, while at the same time preventing this flow from separating. That improves the penetration of the flow in the outlet jet F2 of the nozzle 1.i and therefore improves the mixing of the flows and thus increases the noise-reducing effect of the chevrons 10.

Moreover, the tangents T2 of each of the connection surfaces 12 and the corresponding tangents of the surface 15 of the shaped external face 4A, contiguous with the connection surfaces 12, merge at the points J that form the junction between the connection surfaces 12 and the said contiguous surface 15.

This then prevents there from being any salient edge at the meeting point of these surfaces 12 and 15m, making it possible to avoid perturbing the flow of gas F1.

The various steps in defining the nozzle 1.i equipped with chevrons 10, illustrated in FIGS. 2 and 3 are described in what follows.

Thus, in a preliminary phase, an initial value is attributed to the dimensional parameters defining the chevrons 10 and the three portions of the said divergent part 3D, namely the parameters L1, L2, L3, R1, R2, R3, Rmax, $\beta$ and $\alpha$. By definition, R1, R2 and R3 are all less than Rmax.

Next, the abovementioned dimensional parameters are used to calculate three performance criteria associated with the convergent-divergent nozzle 1.i equipped with the chevrons 10, namely:

the difference CV_DV between the discharge coefficient at take off speed $CD_{CTO}$ and that at cruising speed $CD_{CC}$ of the nozzles $1.i$ equipped with chevrons $1.i$, i.e. CV_DV=$CD_{CTO}$-$CD_{CC}$;

the difference $\Delta$CT between the thrust coefficient at cruising speed $CT_{RC}$ of the reference nozzle 1 without chevrons and that $CT_{CC}$ of the nozzle $1.i$ equipped with chevrons, i.e. $\Delta$CT=$CT_{RC}$-$CT_{CC}$; and the difference $\Delta$EPNdB between the intensity of the jet noise of the reference nozzle 1 and that of the nozzle $1.i$ equipped with chevrons $1.i$ of the invention. The jet noise may, for example, be measured and/or estimated at a predefined distance from the outlet 7 of the nozzle 1 or $1.i$ considered.

Next, a check is made to ensure that the three aforementioned performance criteria CV_DV, $\Delta$CT and $\Delta$EPNdB thus calculated each satisfy predefined performance conditions respectively associated with them.

In particular:

the performance condition associated with the difference in discharge coefficients CV_DV is satisfied when this difference CV_DV is at least equal to a first predefined threshold value. This value is, for example, equal to 0.015 (i.e. CV_DV 0.015);

the performance condition associated with the difference in thrust coefficients $\Delta$CT is satisfied when this difference $\Delta$CT is less than a second predefined threshold value. This value is, for example, equal to 0.001 (i.e. $\Delta$CT<0.001); and the performance conditions associated with the difference in the intensities of the jet noise $\Delta$EPNdB is satisfied when this difference $\Delta$EPNdB is positive (i.e. $\Delta$EPNdB>0) and, for preference, at least equal to a third predefined threshold value.

In the event that at least one of the said calculated performance criteria does not satisfy the performance condition associated with it, a new initial value is attributed to at least one of the aforementioned dimensional parameters, then the three performance criteria are recalculated.

For example, the new initial value may correspond to the earlier initial value incremented by one unit.

For as long as the conditions associated with the three performance criteria are not simultaneously satisfied, the above-mentioned two steps of the previous paragraph are iterated.

When the three calculated performance criteria satisfy the associated performance conditions, the latest values attributed to the dimensional parameters are validated to define the definitive shape of the divergent part 3D of the nozzle $1.i$.

Moreover, it goes without saying that the invention is not restricted either to the three performance criteria described in the example, or to the abovementioned dimensional parameters alone. Indeed, it would be possible for example, when defining a convergent-divergent nozzle with chevrons, to introduce a performance criterion associated with the degree to which the gases expand in the divergent first portion 3Da.

In addition, the fact that these scallops (9) of the chevrons penetrate a fair distance upstream in the divergent part (3D) means that the chevrons can be forced to converge such that their design remains within the initial nacelle. For example, in order to achieve this result, in step B/ of the method, the internal radius R3 at the tip 10A of the chevrons 10 is set initially to a value smaller than that of the internal radius R2 at the tops 9A of the scallops 9 and in step C/ it is forced to remain smaller than the said internal radius R2. The result of optimisation yields a nozzle profile that best meets the predefined performance criteria and satisfies this condition.

Similarly, the method has been applied by forcing the radius R3 of the tip 10A of the chevrons to remain smaller than the radius R1 at the throat of the nozzle.

Finally, this method can be transferred directly to a nozzle suited to a turbomachine when this nozzle is defined between an outer cowl, the outlet geometry of which is adapted using the method and a central body of given geometry. In that case, a nozzle cross section corresponds to each point of the cowl in the transverse direction, as defined at the beginning of the description, and the concepts of divergence or convergence relate to the cross-sectional areas. Likewise, while the value of the radius can still be used to define the shape of the wall of the cowl, the conditions imposed on the radii in the method described in respect of a nozzle of circular cross section, need to be interpreted in terms of the corresponding cross-sectional areas. Finally, present-day numerical methods make it possible to calculate the levels of performance on the various criteria in such a geometry and use them in the optimisation algorithm.

The invention claimed is:

1. A method for defining a shape of an annular cowl including an external wall and an internal wall defining a convergent-divergent nozzle of a longitudinal axis of a turbomachine, either about said longitudinal axis, or about a casing of revolution about said longitudinal axis, said nozzle comprising, in a direction in which gases flow, a convergent part connected, at a throat, to a divergent part a downstream free end of which includes scallops delimiting noise-reducing chevrons distributed in a circumferential direction, the method comprising:

defining the divergent part of the nozzle beforehand using the following two portions:
 a divergent first portion extending longitudinally from the throat of the nozzle as far as tops of the scallops;
 a second portion extending longitudinally between the tops of the scallops as far as tips of the chevrons;
attributing an initial value to dimensional parameters defining the chevrons and the cowl in said divergent part; and
applying an optimization algorithm to the parameters thus initialized in order to define the shape of the convergent-divergent nozzle equipped with the chevrons that satisfies predefined conditions regarding at least one defined performance criterion;
wherein the second portion corresponding to the chevrons is forced to comprise:
 a divergent second portion extending longitudinally between the tops of the scallops and an internal cross-section of maximum cross-sectional area of said divergent part; and
 a convergent portion extending longitudinally from the internal cross-section of maximum cross-sectional area as far as the tips of chevrons.

2. The method for defining the shape of the annular cowl defining the convergent-divergent nozzle according to claim 1, in which a cross-sectional area of an outlet section of the nozzle, at the tips of the chevrons, is forced to be at most equal to a cross-sectional area of the nozzle at the tops of the scallops.

3. The method for defining the shape of the annular cowl defining the convergent-divergent nozzle according to claim 1, in which a cross-sectional area of an outlet section of the nozzle, at the tips of the chevrons, is forced to be at most equal to a cross-sectional area of the nozzle at the throat of the nozzle.

4. The method according to claim 1, in which, during said applying the optimization algorithm, at least three performance criteria associated with the convergent-divergent nozzle equipped with the chevrons are calculated.

5. The method according to claim 1, in which the at least one defined performance criterion belongs to the following group of performance criteria:
- a difference between a discharge coefficient at take off speed and that at cruising speed of the nozzle equipped with the chevrons;
- a difference between a thrust coefficient at cruising speed of a reference convergent-divergent nozzle without the chevrons and that of the convergent-divergent nozzle equipped with the chevrons; and
- a difference between an intensity of the jet noise of the reference convergent-divergent nozzle and that of said convergent-divergent nozzle equipped with the chevrons.

6. The method according to claim 5, in which a performance condition associated with the difference in discharge coefficients is satisfied when this difference is greater than or equal to a first predefined threshold value.

7. The method according to claim 6, wherein the first predefined threshold value is equal to 0.015.

8. The method according to claim 5, in which a performance condition associated with the difference in thrust coefficients is satisfied when this difference is less than a second predefined threshold value.

9. The method according to claim 8, wherein the second predefined threshold value is equal to 0.001.

10. The method according to claim 5, in which a performance condition associated with the difference in jet noise intensities is satisfied when this difference is positive.

11. The method according to claim 10, in which the performance condition associated with the difference in jet noise intensities is satisfied when this difference is at least equal to a third predefined threshold value.

12. The method according to claim 1, in which at least certain dimensional parameters associated with the chevrons and with the three portions of said divergent part of the nozzle belong to the following group of parameters:
- a length, defined in a direction parallel to the longitudinal axis, of the divergent first portion;
- a length of the divergent second portion;
- a length of the convergent portion;
- an internal radius at the tops of the scallops;
- a maximum internal radius of the divergent part of the nozzle;
- an internal radius at the tips of the chevrons;
- an angle formed between the longitudinal axis and a tangent at a downstream end point of a line of an internal surface of the chevrons, said line belonging to an axial plane passing through the tips of the chevrons and intercepting the longitudinal axis; and
- an angle formed between the longitudinal axis and a tangent at a downstream end point of a line of an external surface of the nozzle passing through a top of a scallop and belonging to an axial plane intercepting the longitudinal axis.

13. A convergent-divergent nozzle for a turbomachine, comprising, in a direction in which gases flow, a convergent part connected, at a throat, to a divergent part a downstream free end of which includes scallops delimiting noise-reducing chevrons distributed in a circumferential direction,
wherein said convergent-divergent nozzle is defined according to the method specified in claim 1.

14. The nozzle according to claim 13, in which an internal surface of each of the chevrons is concave.

15. The nozzle according to claim 14, in which the concavity of the internal surfaces of the chevrons is defined in such a way that at least one internal cross-section of the nozzle, defined in a transverse plane locally orthogonal to the longitudinal axis and intercepting said chevrons, is of circular shape.

* * * * *